United States Patent
Dykes et al.

(10) Patent No.: US 6,841,755 B2
(45) Date of Patent: Jan. 11, 2005

(54) OVERLAY CONTROL FOR LASER PEENING

(75) Inventors: Steven E. Dykes, Powell, OH (US);
Allan H. Clauer, Worthington, OH (US); Jeff L. Dulaney, Dublin, OH (US); David F. Lahrman, Powell, OH (US); Mark O'Loughlin, Galloway, OH (US)

(73) Assignee: LSP Technologies Inc., Dublin, OH (US)

( * ) Notice: Subject to any disclaimer, the term of this patent is extended or adjusted under 35 U.S.C. 154(b) by 13 days.

(21) Appl. No.: 10/372,526

(22) Filed: Feb. 21, 2003

(65) Prior Publication Data

US 2003/0213788 A1 Nov. 20, 2003

Related U.S. Application Data (62) Division of application No. 09/767,528, filed on Jan. 23, 2001, now Pat. No. 6,548,782.

(51) Int. Cl.⁷ .............................................. B23K 26/00
(52) U.S. Cl. ................................ 219/121.6; 219/121.85
(58) Field of Search ......................... 219/121.6, 121.83, 219/121.84, 121.85, 121.61, 121.62

(56) References Cited

U.S. PATENT DOCUMENTS

| | | | | | |
|---|---|---|---|---|---|
| 5,735,044 A | * | 4/1998 | Ferrigno et al. | ........... | 29/889.1 |
| 6,094,260 A | * | 7/2000 | Rockstroh et al. | ......... | 356/35.5 |
| 6,183,882 B1 | * | 2/2001 | Mannava et al. | ........... | 428/614 |
| 6,254,703 B1 | * | 7/2001 | Sokol et al. | ................ | 148/508 |

* cited by examiner

*Primary Examiner*—Samuel M. Heinrich
(74) *Attorney, Agent, or Firm*—Randall J. Knuth (57) ABSTRACT

A method of controlling the application of laser peening overlays on the surface of a workpiece to reduce the variability of shock waves generated therein, comprises applying an energy-absorbing overlay to a portion of the surface of a workpiece, measuring the thickness of the energy-absorbing overlay in at least one location on the energy-absorbing overlay, applying a transparent overlay material over the energy-absorbing overlay, measuring the thickness of the transparent overlay in at least one location on the transparent overlay, determining if the measured values for each overlay is within a specified range, and directing a pulse of coherent energy to the workpiece to create a shock wave therein when the measured values are within the specified range.

31 Claims, 8 Drawing Sheets

OVERLAY CONTROL FOR LASER PEENING

CONTINUATION APPLICATION DATA

This is a divisional of patent application Ser. No. 09/767,528 filed on Jan. 23, 2001, now U.S. Pat. No. 6,548,782, the disclosure of which is herein explicitly incorporated by reference.

BACKGROUND OF THE INVENTION

1. Field of the Invention

The present invention relates to the use of coherent energy pulses, as from high-peak-power pulsed lasers used for the laser peening of solid materials and, more particularly, to methods and apparatus to control the application of the overlays applied for laser peening (also called laser shock peening, laser shock processing, and shock processing). The invention is especially useful for reducing the variability of the thickness of the overlays applied to the surface of the workpiece being laser shock peened.

2. Description of the Related Art

Old methods for shock processing of solid materials typically involve the use of high explosive materials or high-pressure gases, which are used to accelerate a plate, that strikes the solid material to produce shock waves therein. Such methods have several disadvantages. For example: (a) it is difficult and costly to shock process non-planar surfaces and complicated geometries, (b) storage and handling of the high explosive materials and high pressure gases pose a hazard, (c) the processes are difficult to automate and thus fail to meet some industrial needs and (d) high explosive materials and high pressure gases cannot be used in extreme environments such as high temperatures and high vacuum.

Shot peening is another widely known and accepted process for improving the fatigue, hardness, and corrosion resistance properties of materials by impact treatment of their surfaces. In shot peening, many small shot or beads are thrown at high speed against the surface of a material. The shot or beads sometimes escape from the treatment equipment and scatter in the surrounding area. Since the shot or beads might get into surrounding machinery and cause damage, shot peening usually cannot be used in a manufacturing line. Ordinarily such shot peening cannot be used on machined surfaces without a high likelihood of damaging them. In addition, shot peening has problems maintaining consistency of treatment caused by inherent wear of the shot by the shot peening equipment.

Laser peening equipment, however, can be incorporated into manufacturing lines without danger to surrounding equipment. Laser peening with coherent radiation has several advantages over what has been done before. For example, the source of the radiation is highly controllable and reproducible. The radiation is easily focused on preselected surface areas and the operating mode is easily changed. This allows flexibility in the desired shock (peening) pressure and careful control over the workpiece area to be laser peened. Workpieces immersed in hostile environments, such as high temperature and high vacuum can be shock processed. Additionally, it is easy to laser peen the workpiece repetitively. This is desirable where it is possible to enhance material properties in a stepwise fashion. Laser peening the workpiece several times at low pressures can avoid gross deformation, cracking, and spallation of the workpiece while nonplanar workpieces can be laser peened without the need of elaborate and costly shock focusing schemes.

Laser peening utilizes two overlays: a transparent overlay (usually water and hereinafter referred to as overlay water) and an energy absorbing opaque overlay; an oil based paint; an acrylic based black paint; or an energy-absorbing tape (and hereinafter referred to as paint). During processing, the paint is locally applied to the surface of the workpiece to be processed, followed by the application of the overlay water. A laser beam is directed to pass through the overlay water and is absorbed by the paint, causing a rapid vaporization of a thin layer of the paint and the generation of a high-amplitude shock wave in the workpiece. The shock wave cold works the surface of the workpiece and creates compressive residual stresses, which provide an increase in fatigue properties of the workpiece. A workpiece is typically processed by laser peening a matrix of overlapping spots that cover the fatigue critical zone of the workpiece.

The method of rapidly applying an energy absorbing overlay or paint, followed by a transparent overlay or overlay water, subsequently laser shock peening the workpiece, and then removing the overlay is presented in U.S. Pat. No. 5,471,559. This method has been successfully implemented into laser peening equipment and has dramatically decreased the processing time and cost; however, the variability in the thicknesses and/or uniformity of the paint or overlay water can potentially lead to differences in the resultant residual stresses in the workpiece and thus change the fatigue life capabilities of the laser-peened workpiece.

To provide a consistent laser shock peening process, the application of the paint and overlay water need to be monitored during processing and subsequently controlled to ensure that the thickness and/or uniformity of the paint and overlay water are the same for each laser shot. What is needed is a method to monitor and control the application of the paint and overlay water during processing to apply a consistent thickness and/or uniformity for each laser shot.

SUMMARY OF THE INVENTION

The present invention provides a method of laser peening that can be used in a production environment to significantly reduce the variability of laser peening by monitoring and controlling the thickness and/or uniformity of both the paint and the water overlays. The method includes the steps of painting the workpiece to be laser peened with a layer of paint applied to a small area about 2 to 3 times the diameter of the laser-peening spot, measuring the thickness and/or uniformity of the paint prior to the application of the overlay water, and recording these measured values. Subsequently, overlay water is applied, forming a thin, flowing layer over the previously painted portion, and the thickness and/or uniformity of the overlay water is measured at a specific time after its initial application, but prior to firing the laser, and the measured values are recorded. The thickness of the paint or overlay water is the distance between the exposed surface of the paint or overlay water and the surface upon which it is applied, and the uniformity is the difference in the thickness between two or more locations on the overlay. The measured values for the paint and water overlay are then compared to the specified range. The specified range may be a predetermined range based upon engineering judgment, or it may be determined by statistical methods. If the measured values are within the specified range, then the laser beam is directed through the water overlay and onto the painted area. If the measured values for the paint and water overlay thickness and/or uniformity are not within the specified range for the process, then the laser is not allowed to fire and the high-speed water jet is activated to wash the paint spot off of the workpiece. The automated process of applying paint and overlay water may be repeated without changes. Alternately, adjustments in the overlay-application parameters or applicator head positions may be made to change the thickness and/or uniformity of the overlays to bring them into the specified range. Adjustments may be made by the controlling computer that sends signals to electronically controlled valves to alter the flow rate, pressure, and application duration of the paint and overlay water applicators, to bring the thickness and/or uniformity values for the two overlays into the specified range for the process. After the adjustments are made to the overlay-application parameters or applicator head positions, the process sequence is restarted.

In the present application, the term "specified range" is the bounds that the thicknesses of the overlays need to be within for continued laser peening operations. "Specified" in the broadest sense may mean limit values created with or without knowledge or historical data on successful laser peening. The term "preselected range" is a fixed range that has been calculated before laser peening commences. The term "statistically determined range of values" is the limit ranges calculated "on the fly" and between each laser peening operation based upon the same ongoing running total or historical data collected and analyzed. For example, the ranges could be calculated as ± one standard deviation from the mean of the last 100 thickness samples. This example is not limiting, other statistical methods and functions may be utilized to create operational bounds or limits to effect overlay thickness control.

The invention comprises, in one form thereof, a method of controlling the thickness of the paint and overlay water. The method involves applying the paint and then the overlay water to the workpiece to be processed based upon thickness. The paint is first applied to a portion of the workpiece. During the application of the paint overlay, the thickness is measured in real time. Upon reaching the specified range for the thickness, a signal is sent from the control computer to terminate the application of the paint and initiate the application of the overlay water. The thickness and/or uniformity of the overlay water are monitored, and when the measured values are within the specified range, the laser is fired and the laser beam is directed through the overlay water and onto the painted area.

The invention comprises, in one form thereof, a method of applying a continuous flow of overlay water to the surface of the workpiece during the laser shock peening process. The overlay water is continuously directed over the surface of the workpiece to be processed. The application of the overlay water is accomplished with an applicator in direct contact with the workpiece or a high-speed water jet. A jet of air is directed toward the overlay water near the area where the paint is to be applied to divert the overlay water to other areas on the workpiece. The air jet is maintained during the application of the paint. The thickness of the paint is measured and when it is within the specified range, the air jet is turned off to allow the overlay water to reform and flow over the paint. The thickness of the overlay water is measured and when it is within the specified range, the laser is fired and the laser beam is directed through the overlay water and onto the painted area.

The invention comprises, in one form thereof, a method of controlling the thickness of the energy absorbing overlay with a tamping device such as an air jet that is directed to the energy absorbing overlay. The position and operation of the air jet may be determined for each workpiece through trial and error experimentation; or preferably, the position and operation of the air jet may be automated. If the air jet is automated, the position and operational parameters of the air jet may be controlled in real-time or may be established through a calibration sequence prior to processing workpieces. In an automated process, the thickness of the energy absorbing overlay is monitored during or after its application to the surface of the workpiece. If the thickness is not within the specified range, the control computer triggers the operation of at least one tamping device such as a jet of air (or other suitable gas) directed toward the paint to conform it to the proper thickness. The air jet or jets may be turned off prior to the application of the water overlay. The tamping device may also be a mechanical tamping block that physically contacts the overlay.

The invention comprises, in a further form of the previous description, the use of air jets or nozzles to control the thickness of the water overlay.

The invention comprises, in yet another form thereof, an apparatus for measuring the thickness of the paint or overlay water that are used for improving properties of a workpiece by providing shock waves therein. The apparatus includes a device to measure the thickness of the paint or overlay water applied to the surface of the workpiece with overlay applicators. Means to control the flow of the overlay materials are provided. A tamping device operatively associated with the measurement device and control unit is used to change the thickness of the overlay on the surface of the workpiece. A laser peening system is operatively associated with the control device to provide a laser beam, which is directed through the overlay water to create a shock wave in the workpiece. The measurement device, material applicators, material applicator flow control means, tamping device and laser peening system, are connected to a control computer that controls the operation and timing of each of the applicators, measurement devices, control valves, tamping devices, and the laser.

The control computer collects the measured thickness values and compares these values to the specified values for the laser peening operation on the workpiece being processed. The control computer determines if the values for an overlay are within the specified tolerance range. If they are within the specified range, the laser operatively associated with the process is fired to generate a shock wave on the surface of the workpiece. If these measured values are not within the specified thickness range, the computer prevents the laser beam from being fired and sends a signal to remove the paint and overlay water. The control computer makes adjustments to the flow of the overlay applicator that is out of the specified range, reapplies the paint and overlay water, again measuring the thickness of the paint and overlay water at specific points during or after application. The control computer may also activate a tamping device such as an air jet to change the thickness or smooth the paint or overlay water.

An advantage of the present invention is that it provides a method to ensure a consistent thickness of an overlay, which provides more consistent and repeatable laser peening results within the workpiece.

Another advantage of the present invention is that the control computer can control the timing of the application of the paint and overlay water by measuring the thickness during application of these overlays.

Yet another advantage of the present invention is that the control computer can make adjustments to the control valves to modify the thickness of the paint and overlay water.

A further advantage of the present invention is that the control computer can modify the thickness of the overlays applied to the surface of the workpiece by use of an tamping device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The improvements in fatigue life produced by laser peening are the results of residual compressive stresses developed in the irradiated surface retarding fatigue crack initiation and/or slowing the crack propagation rate. A crack front is the leading edge of a crack as it propagates through a solid material. Changes in the shape of a crack front and slowing of the crack growth rate when the crack front encounters the laser shock zone in a laser peening condition have been shown. Laser peening is an effective method of increasing fatigue life in metals by treating fatigue critical regions. As to what effect the tensile residual stresses surrounding the laser shocked region would have on crack initiation, a previous study is described in "Shock Waves and High Strained Rate Phenomena in Metals" by A. H. Clauer, J. H. Holbrook and B. P. Fairand, ed. by M. S. Meyers and L. E. Murr, Plenum Press, New York (1981), pp. 675–702. Described in the above reference are the effects of laser peening on fatigue of welded aluminum specimens that had used a series of overlapping spots to cover the weld and heat-affected zones. Significant increases in fatigue life were observed for these specimens, indicating that overlapping the spots did not significantly reduce the effects of laser shocking. This is supported by results on a low carbon steel that showed no change in the compressive residual stress profile across the edge of a spot in a spot-overlap region.

For a more thorough background in the prior history of laser peening and that of high power processing of engineered materials, reference can be made to U.S. Pat. No. 5,131,957, such patent explicitly hereby incorporated by reference. This patent also shows a type of laser and laser circuit adaptable for use with the present invention. Another type of laser adaptable for use with the invention is that of a Nd:Glass Laser manufactured by LSP Technologies of Dublin, Ohio.

Overlays are applied to the surface of the workpiece being laser peened. These overlay materials may be of two types, one transparent to laser radiation and the other opaque to laser radiation. They may be used either alone or in combination with each other, but it is preferred that they be used in combination with the opaque overlay adjacent the workpiece, and the outer, transparent overlay being adjacent the opaque overlay.

The transparent overlay material should be substantially transparent to the radiation. Useful transparent overlay materials include water, water-based solutions, other non-corrosive liquids, glass, quartz, sodium silicate, fused silica, potassium chloride, sodium chloride, polyethylene, fluoroplastics, nitrocellulose, and mixtures thereof. Fluoroplastics, as they are known by ASTM nomenclature, are parallinic hydrocarbon polymers in which all or part of each hydrogen atom has been replaced with a fluorine atom. Another halogen, chlorine, can also be part of the structure of a fluoroplastic. By order of decreasing fluorine substitution and increasing processability, these materials include polytetrafluoroethylene (PTFE); fluorinated ethylenepropylene (FEP): the chlorotrifluorethylenes (CTFE); and polyvinylidine fluoride ($PVF_2$). Also available is a variety of copolymers of both halogenated and fluorinated hydrocarbons, including fluorinated elastomers. Additionally, the transparent overlay could be a gel or a strip of tape comprised of one or more of the above materials. In the preferred embodiment of the present invention, water is used as the transparent overlay to confine the plasma.

Where used, the opaque overlay material should be substantially opaque to the radiation. Useful opaque overlay materials include black paint, pentacrythritol tetranitrate (PETN); bismuth, lead, cadmium, tin, zinc, aluminum, graphite; and mixtures of charcoal or carbon black with various transparent materials such as mixtures of nitrocellulose and potassium perchlorate or potassium nitrate. Optionally, a layer of another solid overlay material may be attached to the layer of substantially opaque material. The outer, solid layer may be either transparent or opaque. The term "transparent" in this application is defined as meaning pervious to the laser beam utilized, not automatically or necessarily pervious to visible light. A typical overlay is between 10 micrometers and 20,000 micrometers (m) thick. In the preferred embodiment of the invention, water based black paint is used to give superior results both in terms of energy absorption and removability after laser peening.

Figure 1:
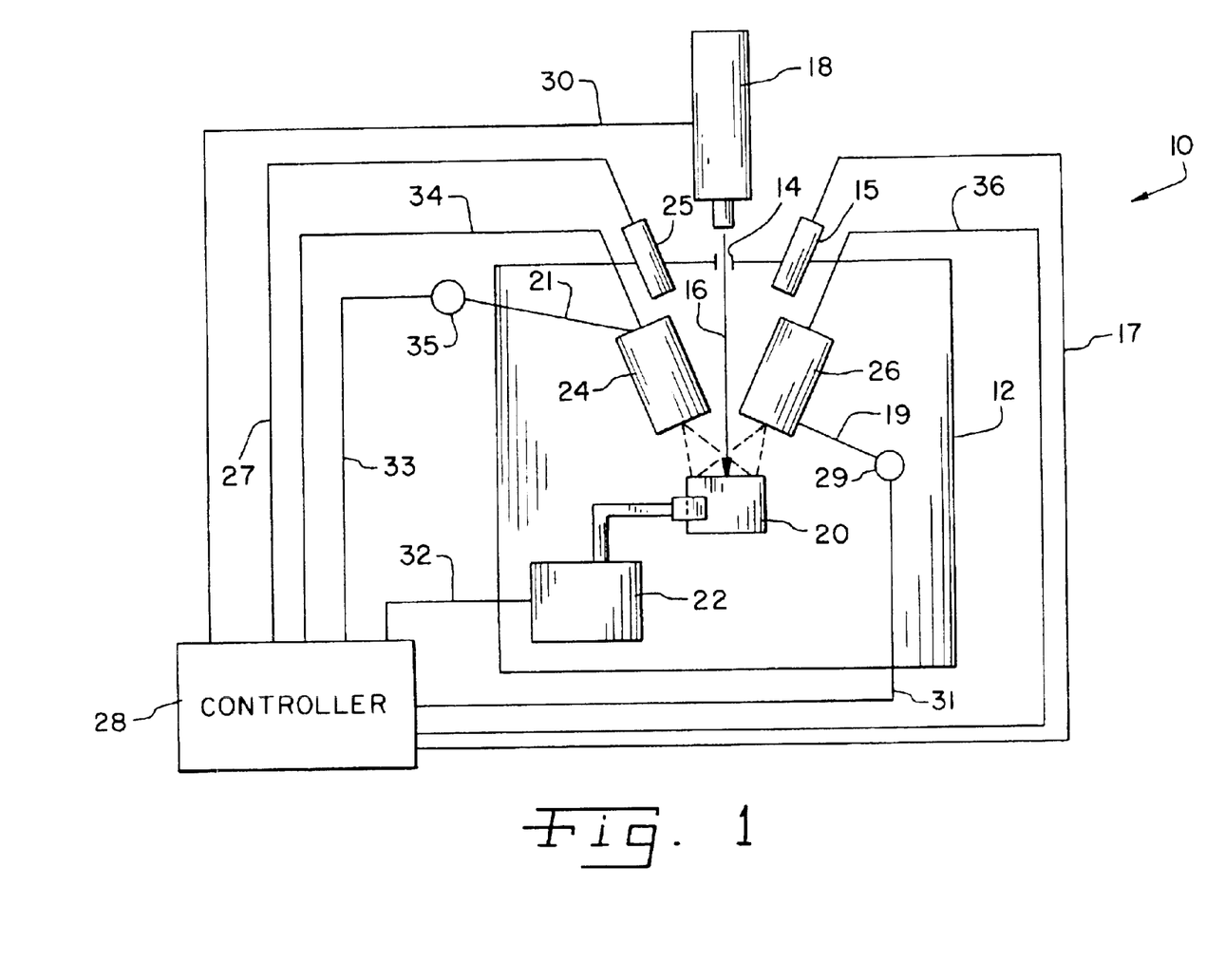
FIG. 1 is a diagrammatic view of one embodiment of the present invention.

Referring now to the drawings and particularly to FIG. 1, there is shown a preferred embodiment 10 of the present invention including a laser-peening chamber 12 in which the laser peening takes place. The laser-peening chamber 12 includes an opening 14 for a laser beam 16 created by laser 18, a source of coherent energy. Laser 18, by way of example, may be a commercially available high power pulse laser system capable of delivering more than approximately 10 Joules in 5 to 100 nanoseconds. The laser beam energy, pulse length and spot size on the workpiece may be adjusted as known in the art. Shown in FIG. 1, a workpiece 20 is held in position within laser-peening chamber 12 by means of a positioning mechanism 22. Positioning mechanism 22 may be of the type of a robotically controlled arm or other apparatus to precisely position workpiece 20 relative to the operational elements of laser shock system 10.

Laser peening system 10 may include a material applicator 24 for applying an energy absorbing material onto workpiece 20 to create a coated portion. Material applicator 24 may be that of a solenoid operated painting station or other construction such as a jet spray or aerosol unit to provide a small, coated area onto workpiece 20. The material utilized by material applicator 24 is an energy absorbing material, preferably that of a black, water-based paint such as 1000 F AQUATEMP (™) from Zynolite Product Company of Carson, Calif. Another opaque overlay that may be utilized is that of ANTI-BOND, a water soluble gum solution, including graphite and glycerol from Metco Company, a Division of Perkin-Elmer of Westbury, N.Y. Alternatively, other types of opaque overlays may be used such as those discussed above.

Laser peening system 10 further includes a transparent overlay applicator 26 that applies a fluid or liquid transparent overlay to workpiece 10 over the portion coated by opaque overlay applicator 24. The transparent overlay material should be substantially transparent to the radiation as discussed above, water being the preferred overlay material.

Figure 2:
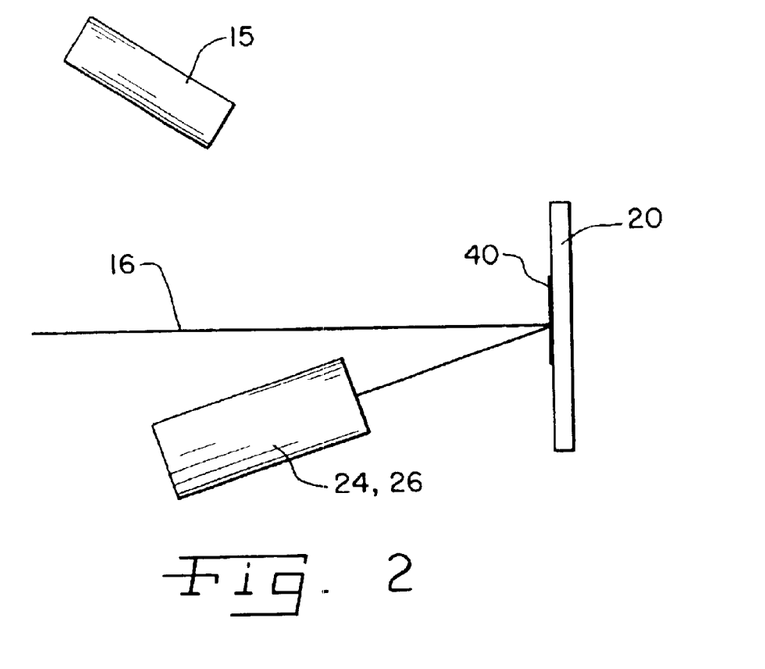
FIG. 2 is a diagrammatic view of the measurement device relative to the position of the overlay to be measured.

Laser peening system 10 also includes a measurement device 15 to measure the thickness of the paint and overlay water. The measurement device is preferably a non-contact device that is capable of measuring the paint and overlay water thickness from a distance and will not interfere with the operation of the applicator heads 24 and 26. Referring to FIG. 2, a diagrammatic view of one arrangement of the relative position of the measurement device 15 to the surface of the overlay surface to be measured 40 on workpiece 20 that does not interfere with the propagation of laser beam 16 or the operation of the overlay applicator head 24, 26 is shown. This measurement device may be that of an image processing camera or laser thickness measurement system, for example, a CCD laser displacement sensor made by Keyence model LK-503 of Woodcliff Lake, N.J.

An image processing system using a subtraction algorithm (image before and after the overlay is applied) may be used to provide a plurality of thickness measurements over the entire area to be irradiated with the laser pulse. Alternatively, other single-point measurement devices may be scanned over the area to obtain a plurality of thickness measurements. The plurality of thickness measurements may then be used to obtain a quantitative measure of the uniformity of the overlay. The use of the term uniformity means a plurality of thickness measurements mathematically combined to determine a measure of the variation of thickness across the overlay. In one simple form the uniformity may be expressed as the standard deviation of the thickness measurements. The overlay is considered to be acceptable if both the thickness and the Standard deviation (uniformity) are within a predetermined range.

It is also important to note that, in this preferred embodiment shown in FIG. 1, measurement device 15 is capable of measuring the thickness of both paint and water. However, it may be necessary to use two measurement devices (15, 15'), one for measuring the opaque-overlay thickness and one for measuring transparent-overlay thickness.

Laser peening system 10 includes tamping device 25 to change the thickness and/or uniformity of the paint or overlay water. The tamping device may direct a controlled pulse of gas to the surface of the applied overlays to alter the thickness and uniformity of the applied overlays. Alternatively, the gas may be directed to the workpiece surface near the overlay to affect the thickness and uniformity of the overlay. The gas may be compressed air or other compressed gasses directed through the nozzle.

As shown in FIG. 1, both opaque overlay applicator 24 and transparent overlay applicator 26 are shown directly located within laser-peening chamber 12 along with the measurement device 15 and tamping device 25. In a production operation environment, only the necessary operative portions need be located through and within laser-peening chamber 12 such as the portion through which the overlay materials actually flow onto the workpiece. The supply tanks, pumps and other auxiliary equipment for applying the transparent overlay materials and energy absorbing overlay materials may be located outside of laser-peening chamber 12. The location of the measurement device may be located either near the workpiece 20 being processed or outside chamber 12 with a clear path to the area being processed on workpiece 20. Tamping device 25 needs to be located in close proximity to the workpiece 20 preferably near applicator heads 24 and 26.

A control unit, such as controller 28 is operatively associated with each of the opaque overlay material applicator 24, transparent overlay material applicator 26, measurement device 15, tamping device 25, laser 18 and positioning mechanism 22. Controller 28 controls the operation and timing of each of the applicators 24, 26, tamping device 25, laser 18 and selective operation of positioning mechanism 22 to ensure proper sequence and timing of laser peening system 10. In addition, controller 28 acquires the thickness and uniformity measurements from measurement device 15. Shown in FIG. 1, controller 28 is connected to laser 18, positioning mechanism 22, opaque overlay material applicator 24, transparent overlay material applicator 26, measurement device 15 and tamping device 25 via control lines 30, 32, 34 36, 17 and 27, respectively. Controller 28 is also connected to control valves 29 and 35 via lines 31 and 33 respectively, and to control material input lines 19 and 21 for applicators 24 and 26, respectively. Controller 28, in one embodiment, may be a programmed personal computer or microprocessor.

Figure 3:
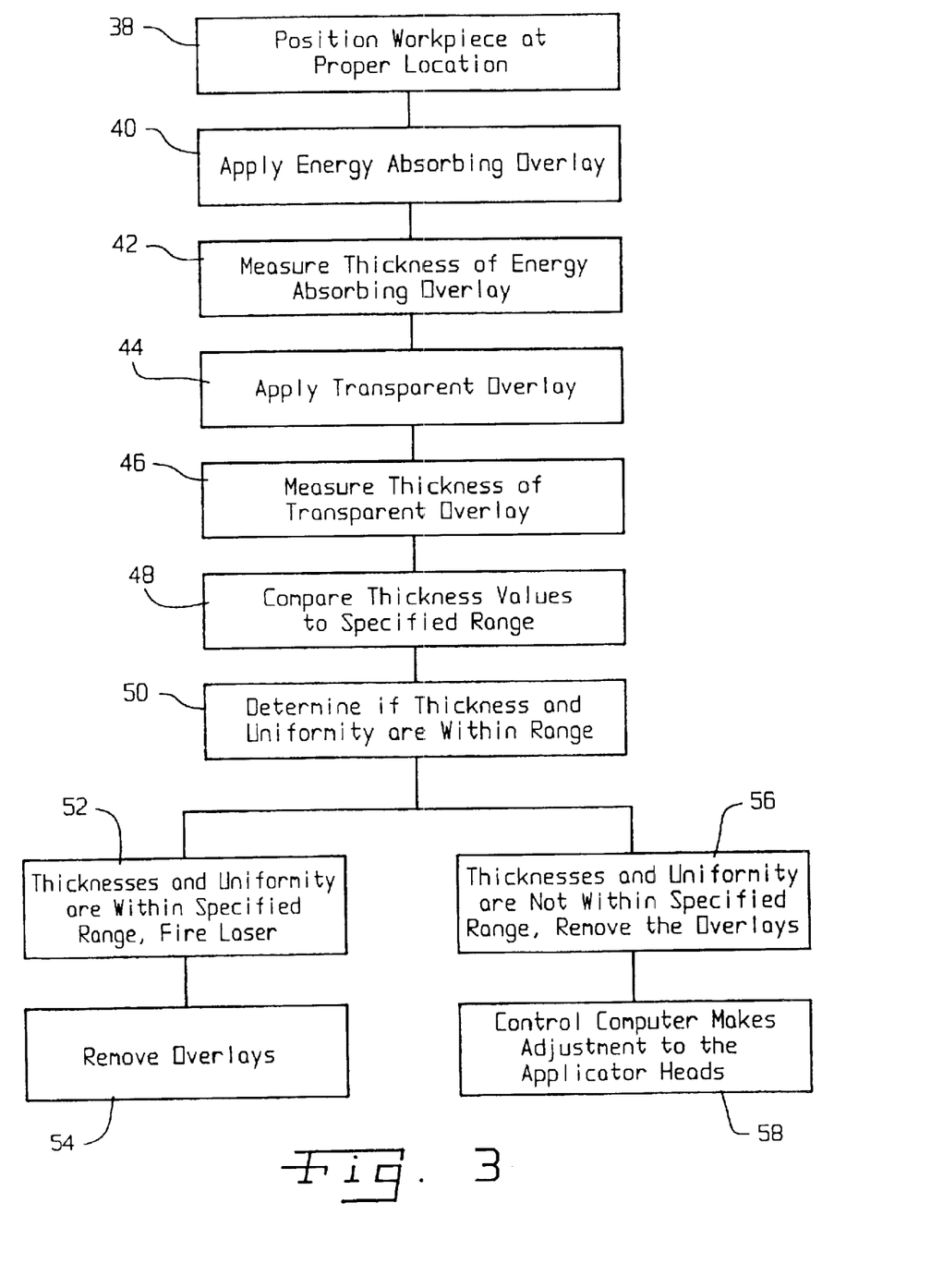
FIG. 3 is a flow chart of the method of the present invention for measuring the thickness and uniformity of the paint and overlay water.

In operation, controller 28 controls operation of laser peening system 10 once initiated. As shown in FIG. 3, the method of the invention is that first, workpiece 20 is located (38) particularly within laser-peening chamber 12 by positioning mechanism 22. Controller 28 activates material applicator 24 to apply an energy absorbing overlay (40) such as a water-based black paint onto a particular location of workpiece 20 to be laser peened. Next the controller acquires a thickness and/or uniformity measurement of the paint (42) from measurement device 15 and stores the value in controller 28. The next step of the process is that controller 28 causes transparent overlay material applicator 26 to apply transparent overlay (44) to the previously coated portion of workpiece 20. The controller acquires a thickness measurement of the transparent overlay (46) and stores this value in controller 28. At this point, controller 28 compares the measured thickness and uniformity values of the paint and overlay water to the specified values (48) for each. These specified values may be a predetermined range of values based upon processing conditions or a specified range, which may be based upon a statistically determined range. If the measured values for the two overlays are within specified range (52), laser 18 is immediately fired (52) by controller 28 to initiate a laser beam 16 to impact the coated portion. If the measured values are not within the specified range (56) the controller 28 initiates a wash sequence and removes the overlays (56). The controller then makes adjustments to the applicator head valves 29 and 35 to achieve the desired thickness and uniformity values (58).

Figure 4:
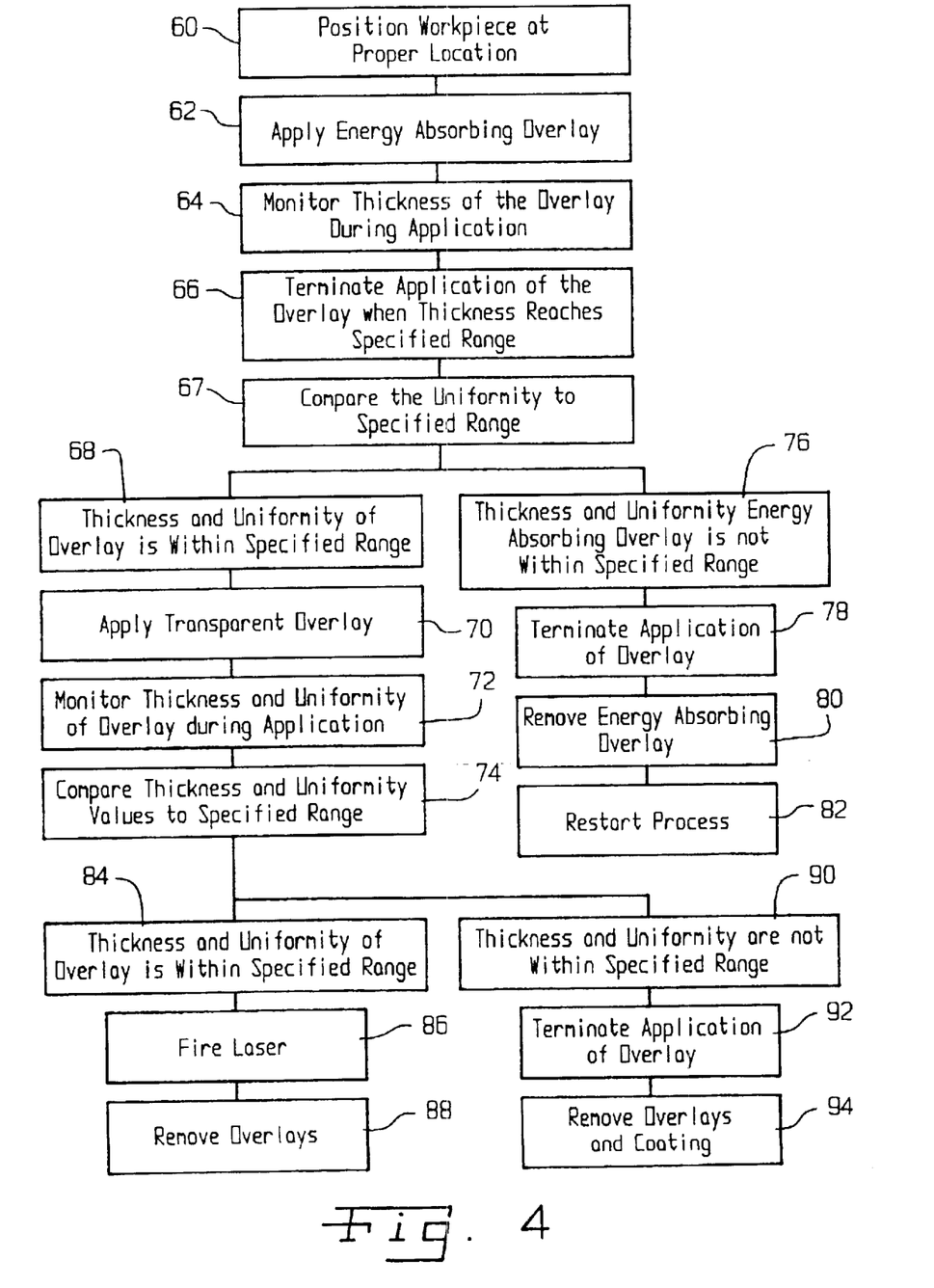
FIG. 4 is a flow chart of another method of the present invention for measuring the thickness and uniformity of the paint and overlay water.

In operation, controller 28 controls operation of laser peening system 10 once initiated. As shown in FIG. 4, the method of the invention is that first, workpiece 20 is positioned at the proper location within laser-peening chamber 12, by positioning mechanism 22(60). Controller 28 activates overlay applicator 24 to apply a laser-energy absorbing overlay (62) such as paint onto a particular location of workpiece 20 to be laser peened. The controller 28 acquires a thickness and/or uniformity measurement (64) of the paint from measurement device 15 and terminates the applications of the overlay when the thickness is within the specified range (66). The uniformity of the energy absorbing overlay is compared to a specified range (67). When the thickness and uniformity are within the specified range (68), the application of the energy-absorbing overlay is terminated and the controller 28 applies the overlay water (70). The controller acquires a thickness and uniformity measurement (72) of the overlay water and compares them to the specified range (74). If the uniformity of the laser-energy absorbing overlay is not within the specified range (76), the application of the laser-energy absorbing overlay is terminated (78) and it is removed (80) and the application of the energy absorbing overlay is restarted (82). If the thickness and uniformity are within the specified range (68), the controller 28 applies the overlay water (70) and then measures the thickness and uniformity of this overlay (72) with measurement device 15. The controller 28 compares these values to the specified range (74). If the thickness and uniformity of the overlay water is not within the specified range (90), the controller 28 terminates the application of the overlay water (92) and initiates the overlay removal (94). If the thickness and uniformity of the overlay water are within the specified range (84), laser 18 is immediately fired (86) by controller 28 and laser beam 16 is directed to the workpiece to generate a shock wave and then the process is restarted (88).

Figure 5:
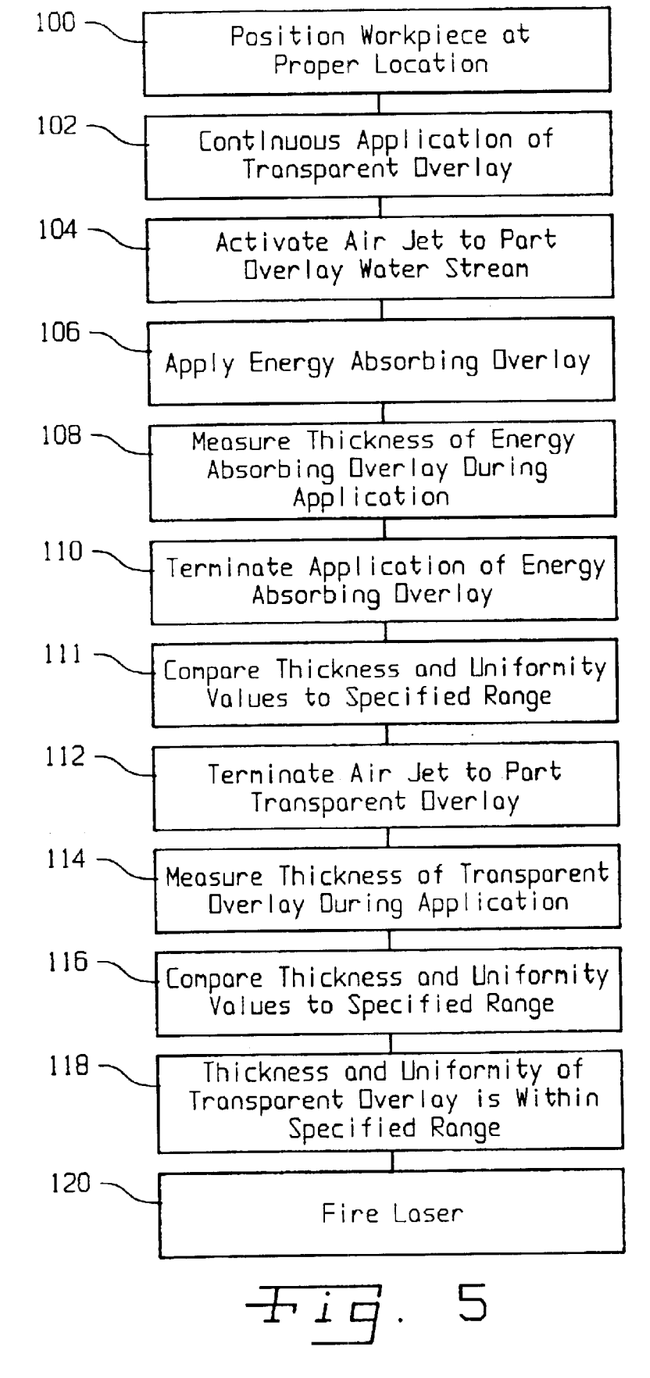
FIG. 5 is a flow chart of yet another method of the present invention for measuring the thickness and uniformity of the paint and overlay water.
Figure 6A:
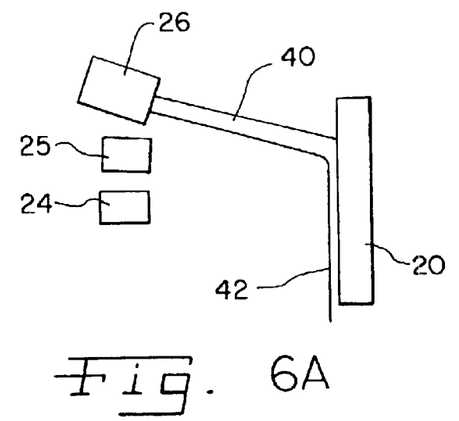
FIG. 6 is a series of views (A–H) of depicting the application of the energy absorbing coating while continuously applying water overlay with a water jet.
Figure 6B:
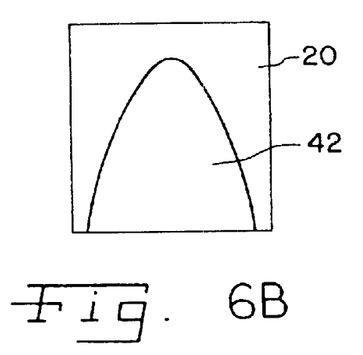
Figure 6C:
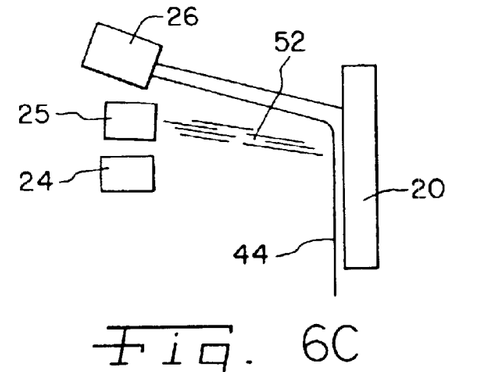
Figure 6D:
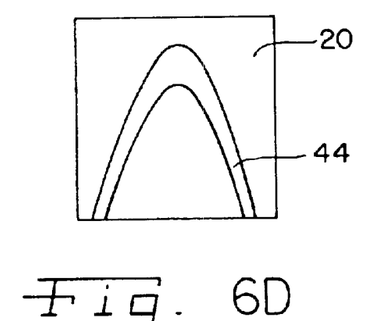
Figure 6E:
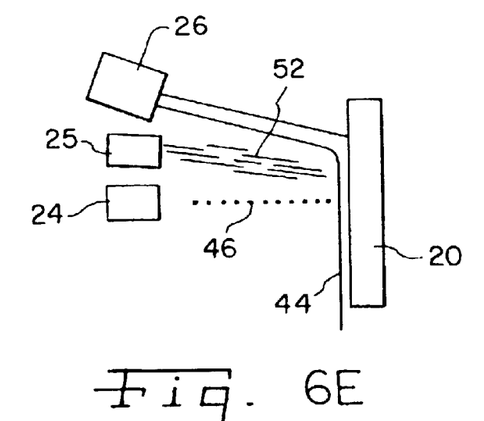
Figure 6F:
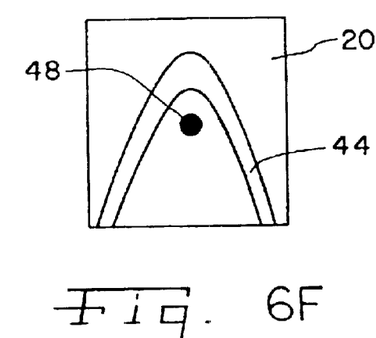
Figure 6G:
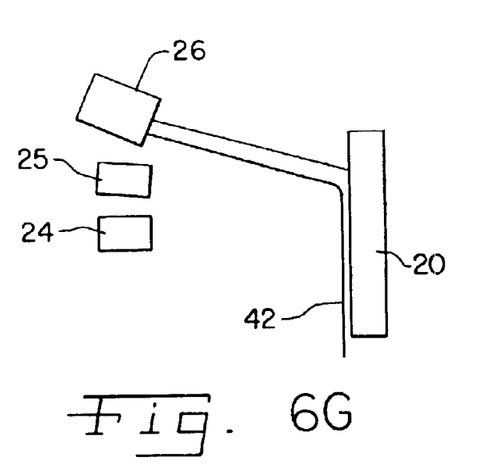
Figure 6H:
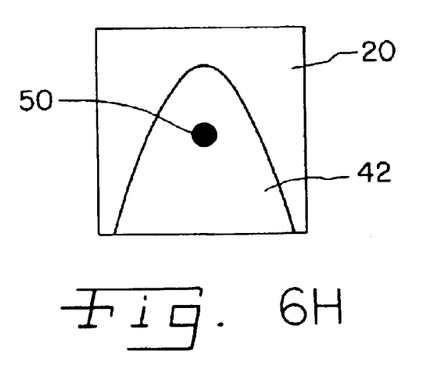

In operation, controller 28 controls operation of system 10 once initiated. As shown in FIG. 5, the method of the invention is that first, workpiece 20 is located (100) particularly within laser-peening chamber 12 by positioning mechanism 22. FIG. 6 shows a sequence of the method for one type of arrangement. Controller 28 activates overlay water applicator 26 to apply a continuous flowing stream (42) of overlay water (102) to the surface of workpiece 20. The stream 40 impinges on the surface of work piece 20 and produces a layer of water 42 on the surface of the work piece in the shape of a parabola. The air jet 25 directed toward the area on the workpiece to be processed is activated (104) in order to divert the stream of overlay water (44) flowing over the area to be processed on the workpiece 20. The controller 28 activates a material applicator 24 to apply paint 46 (106) to the surface of the workpiece 20. The controller 28 continuously measures the thickness (108) of the paint 48 on workpiece 20 with measuring device 15 during the application and upon reaching the designated thickness, the controller 28 terminates the application (110) of the paint from material applicator 24. Controller 28 compares the measured thickness and uniformity values to the specified range (111) and if they are within the specified range, the controller 28 terminates the jet of air 52 (112) coming from air jet nozzle 25 to allow the overlay water to flow over the newly applied paint. Controller 28 acquires thickness and uniformity measurements (114) from measurement device 15 of the overlay water on the area to be processed on workpiece 20. The thickness and uniformity values are compared to a specified range (116) and if the measured values are within the specified range (118), laser 18 is immediately fired (120) by controller 28 and laser beam 16 is directed to the workpiece. This sequence decreases total cycle time between laser peening operation, thereby reducing processing costs.

Figure 7:
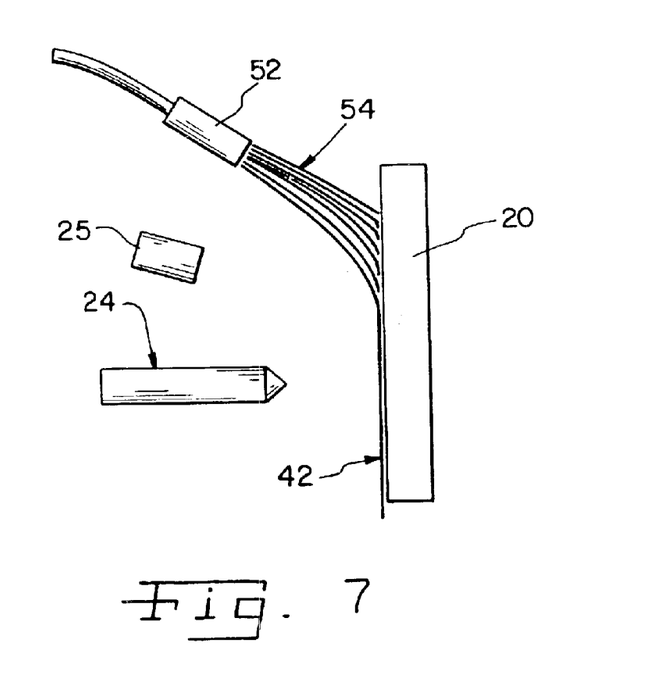
FIG. 7 is a diagrammatic view of applying a continuously applying water overlay with a brush applicator in contact with the workpiece.

An alternate method of applying the water overlay to the surface of the part is to use a brush applicator 52 as shown in FIG. 7 that has bristles 54 in contact with work piece 20 to produce a layer of water 42 on the surface of work piece 20. The water overlay 42 is diverted with the air jet device 25 to allow the applicator 24 to apply the energy-absorbing coating.

Although a brush applicator 52 with bristles 54 is disclosed, other equipment and means may equivalently be utilized to produce a controlled layer of water 42. Other equivalent structures would utilize the surface tension of the water to control application and distribution of the water flow, such as sponges, wipers, members with multiple openings or pores, or other structures to create a substantial flat sheet of water on the workpiece.

Additionally, the applicator may include a laminar, slow control means to produce a substantially nonturbulent flow of water as applied to the workpiece. One structure for creating a laminar flow would be a plurality of adjacent then walled tubes or conduit through which the water would be conducted to workpiece. The thin walled tubes may be oriented and spaced so that their output ends conform to a surface of the workpiece.

Figure 8:
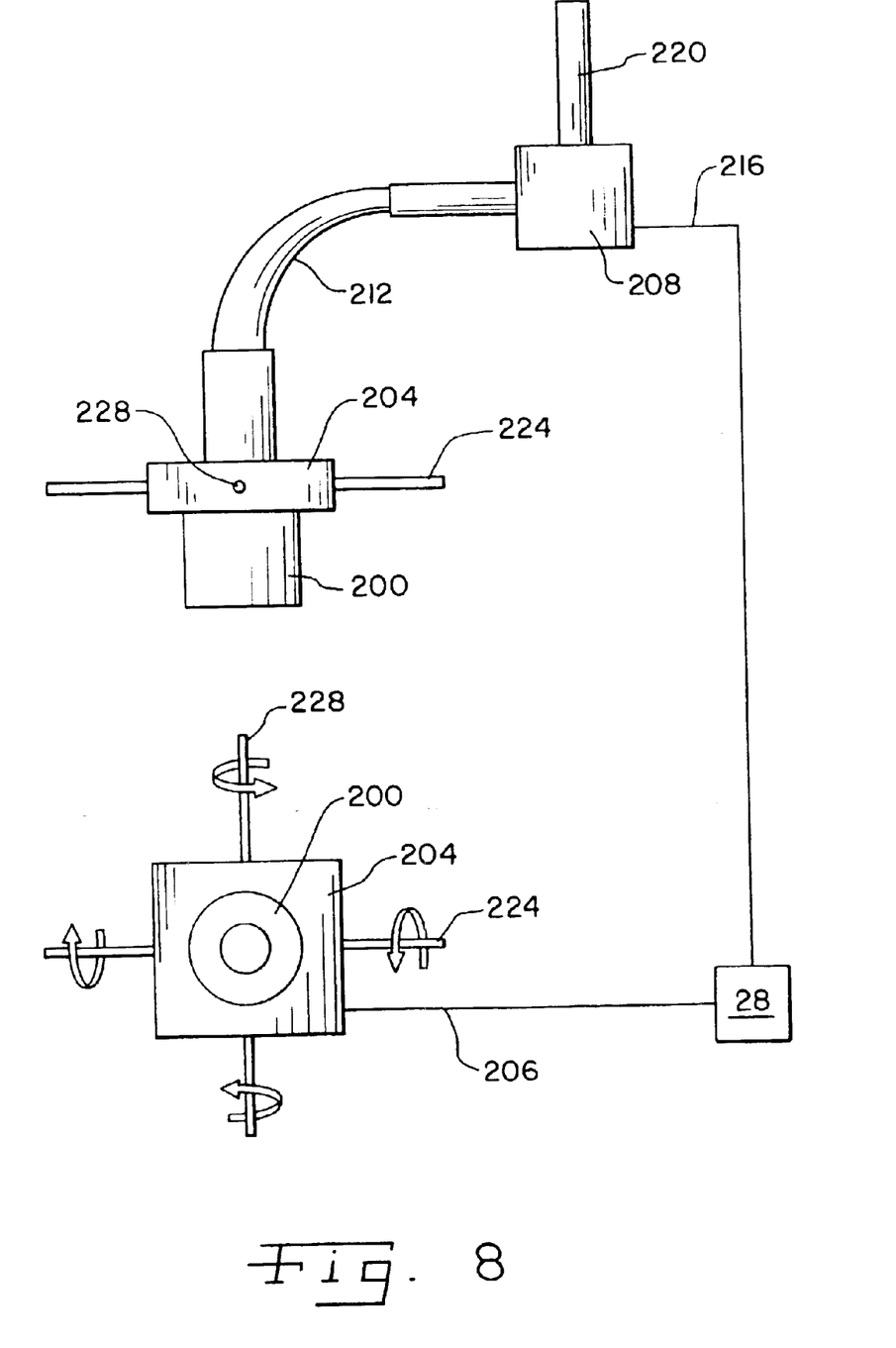
FIG. 8 is a diagrammatic view of one embodiment of a tamping device used to modify the thickness of an overlay.

Additional to the basic method of operation, it may be advantageous to manipulate the thickness and uniformity of the paint and overlay water applied to the surface of the workpiece 20 to be processed. When the measurements of the thickness and/or uniformity of the paint and/or overlay water do not fit within the target range, the controller 28 can activate the air jet nozzle 25 to deliver precise duration and pressure of a jet of air to the paint and or overlay water to tamp it to the desired thickness and uniformity on the workpiece 20. As shown in FIG. 8, a device to tamp the overlays is composed of a nozzle 200 mounted on a computer controlled gimbal 204 to allow the nozzle to be directed around axis 224 and 228 as instructed by controller 28 through control line 206 to tamp the overlay in any area as needed. The tamping device is connected to a hose 212 that supplies compressed gas to the nozzle 200 when solenoid 208 is activated by controller 28 through control line 216. The solenoid 208 is connected to a compressed gas supply by hose 220.

The above-described process or portions of the process are repeated to laser peen the desired surface area of workpiece 20. Depending upon the energy levels and the amount of laser peening desired on workpiece 20, controller 28 may position or re-index workpiece 20 into another position using positioning mechanism 22, so that laser peening system 10 may apply overlays to a different portion of the surface, which may overlap the previously laser-peened area.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for monitoring and controlling the thickness and uniformity of the energy absorbing overlay and the transparent overlay, in a laser peening system comprising:
   a material applicator for applying an energy absorbing overlay onto the a workpiece;
   a material applicator for applying a transparent overlay over said coated portion;
   a measurement device to measure the thickness of said energy absorbing overlay and said transparent overlay;
   a measurement device to measure the uniformity of said energy absorbing overlay and said transparent overlay;
   a tamping device to alter said thickness and said uniformity of said energy absorbing overlay and said transparent overlay;
   a laser operatively associated with said transparent overlay applicator to provide a laser beam through the transparent overlay to create a shock wave on the workpiece; and
   a control unit operatively associated with each of said applicator, each said measurement device, said damping device, and said laser, to control the operation and timing of each said applicator, said measurement device, said tamping device and said laser.

2. The apparatus of claim 1 in which said control unit is a programmable personal computer.

3. The apparatus of claim 1 further in which said measurement devices are optical measurement devices.

4. The apparatus of claim 1 further comprising control valves for each said material applicator to control the pressure and flow of said energy absorbing overlay and said transparent overlay wherein each said control valve is operatively associated with said control unit.

5. The apparatus of claim 1 wherein said tamping device is an air jet nozzle operatively associated with said control unit.

6. The apparatus of claim 1 wherein a positioning mechanism is used to index said workpiece past each said material applicator and is operatively associated with said control unit.

7. The apparatus of claim 1 in which said transparent overlay applicator is a brush.

8. The apparatus of claim 1 in which said transparent overlay applicator includes a laminar flow means.

9. A method of controlling the application of a transparent overlay on the surface of a workpiece to reduce the variability of shock waves generated therein, comprising:
   applying a transparent overlay material over said surface of said workpiece;
   measuring the thickness of said transparent overlay in at least one location on said transparent overlay;
   determining if said measured value for said overlay is within the specified range; and directing a pulse of coherent energy to said workpiece to create a shock wave therein when said measured value is within the specified range.

10. The method of claim 9 wherein said workpiece has an opaque overlay applied prior to laser peening.

11. The method of claim 10 wherein said opaque overlay is paint.

12. The method of claim 10 wherein said opaque overlay is tape.

13. A method of controlling the application of an overlay on the surface of a workpiece to reduce the variability of shock waves generated therein, comprising:
   applying an overlay material over said surface of said workpiece;
   tamping the overlay with a tamping device to alter the thickness of said overlay; and
   directing a pulse of coherent energy to said workpiece to create a shock wave therein.

14. The method of claim 13 in which a control unit is operatively associated with said tamping device.

15. The method of claim 13 in which said control unit is a programmable personal computer.

16. The method of claim 13 wherein said tamping device is an air jet nozzle operatively associated with a control unit.

17. The method of claim 13 wherein said tamping device contacts the surface of the overlay operatively associated with a control unit.

18. The method of claim 13 further comprised of measuring the thickness of the overlay with measuring devices operatively associated with a control unit.

19. The method of claim 17 further comprised of measuring the thickness of the overlay at several locations operatively associated with a control unit.

20. The method of claim 17 further comprised of comparing the thickness of said overlay to a specified thickness range.

21. The method of claim 17 in which said measurement devices are optical measurement devices.

22. The method of claim 13 wherein a positioning mechanism is used to index said workpiece past each said tamping device and is operatively associated with said control unit.

23. The method of claim 13 wherein the thickness of said overlay is tamped to a desired thickness.

24. The method of claim 13 further comprised of alternatively activating the air jet to tamp the thickness of said energy absorbing overlay and measuring the thickness of said overlay until the thickness of said overlay is within the specified range.

25. The method of claim 13 wherein said overlay is a transparent overlay to said laser beam.

26. The method of claim 24 wherein said transparent overlay is water.

27. The method of claim 13 wherein said overlay is an opaque overlay to said laser beam.

28. The method of claim 26 wherein the said opaque overlay is paint.

29. The method of claim 26 wherein the said opaque overlay is tape.

30. The method of claim 13 wherein said overlay is an water applied over the surface of the part previously coated with an opaque overlay.

31. A method of controlling the application of laser peening overlays on the surface of a workpiece to reduce the variability of shock waves generated therein, comprising:
   applying an energy-absorbing overlay to a portion of the surface of a workpiece;
   measuring the thickness of said energy-absorbing overlay in at least one location on said energy-absorbing overlay;
   applying a transparent overlay material over said energy-absorbing overlay;
   determining if said measured value for said energy absorbing overlay is within a specified range; and
   directing a pulse of coherent energy to said workpiece to create a shock wave therein when said measured value is within the specified range.

* * * * *